United States Patent [19] [11] 3,801,183
Sevelin et al. [45] Apr. 2, 1974

[54] RETRO-REFLECTIVE FILM
[75] Inventors: Charles V. Sevelin, Amador Township, Chisago County; Philip V. Palmquist, Maplewood, both of Minn.
[73] Assignee: Minnesota Mining and Manufacturing Company, St. Paul, Minn.
[22] Filed: June 1, 1973
[21] Appl. No.: 366,040

Related U.S. Application Data
[63] Continuation-in-part of Ser. No. 186,172, Oct. 4, 1971, abandoned.

[52] U.S. Cl................ 350/105, 350/109, 350/165
[51] Int. Cl............................................... G02b 5/12
[58] Field of Search.......................... 350/163–165, 350/105, 109

[56] References Cited
UNITED STATES PATENTS
3,025,764  3/1962   McKenzie............................ 350/105
3,154,872  11/1964  Nordgren............................. 350/105
3,288,618  11/1966  DeVries............................... 350/105
3,172,942  3/1965   Berg.................................... 350/105
2,937,668  5/1960   Carey, Jr. et al..................... 350/105

*Primary Examiner*—Ronald L. Wibert
*Assistant Examiner*—Michael J. Tokar
*Attorney, Agent, or Firm*—Alexander, Sell, Steldt & Delahunt

[57] ABSTRACT

Legend containing substantially transparent retro-reflective sheet materials and articles to which the sheet material has been applied, the sheet material having both retro-reflective legend areas and retro-reflective background areas which are substantially indistinguishable under ordinary diffuse light viewing conditions but are clearly distinguishable under retro-reflective viewing conditions inasmuch as either the background or the legend is a more efficient retro-reflector. The sheet material includes a monolayer of glass microspheres of at least 1.8 refractive index having a partially light-transmissive mirror in optical connection with the rear surfaces of the beads, the retro-reflective efficiency differing in the legend and background areas. The sheet material may have a pressure-sensitive or other adhesive on the rear surface thereof.

11 Claims, 7 Drawing Figures

INVENTORS
CHARLES V. SEVELIN
PHILIP V. PALMQUIST
BY Kinney, Alexander,
Sell, Steldt & DeLaHunt
ATTORNEYS

RETRO-REFLECTIVE FILM

This is a continuation-in-part of U.S. Pat. application Ser. No. 186,172 filed Oct. 4, 1971 now abandoned.

This invention relates to substantially transparent retro-reflective sheets having, self-contained within their structure, legends or markings which are invisible or only faintly visible to the naked eye of an observer under ordinary daylight diffuse lighting conditions but which become plainly visible when the structure is viewed under retro-reflecting conditions.

Non-transparent retro-reflective sheeting is of course well known in the art. In most instances such sheet materials depend upon a self-contained opaque layer of aluminum, or of aluminum or other specular reflecting pigment, or a semi-specularly reflecting opaque layer containing pigment such as $TiO_2$ behind the surface layer of glass microspheres, so as to provide the desired retro-reflective optical system. Such prior art sheet materials are opaque and block out from view the underlying portion of any substrate to which they are applied. Accordingly, the sheet materials of the present invention are referred to as being substantially transparent because of the fact that when applied to a substrate such a typewritten letter, it is still possible to read the letter through the applied sheet material under ordinary diffuse light viewing conditions (but when viewed under retro-reflective viewing conditions, the underlying portion of the letter is substantially obliterated to the observer).

Transparent sheeting containing a monolayer of glass microspheres is also known, e.g. see Palmquist U.S. Pat. No. 2,432,928, but such sheet material must be applied to a substrate, such as a sign, before a retro-reflective structure is formed, and the underlying legend or other graphic intelligence is preserved for the viewer under retro-reflective viewing conditions, rather than being obliterated.

Also it is known from Nordgren U.S. Pat. No. 3,154,872 to provide a tamper-resistant retro-reflective sheet material that contains a legend, which may be bonded to documents, passes, licenses and the like to serve as an identification or authentication marking. However, the sheeting is opaque and masks out the substrate to which it is applied. Moreover, while the legend is visible to the observer under ordinary diffuse lighting, under retro-reflective viewing conditions the structure appears uniformly retro-reflective to the viewer.

The present invention provides a substantially transparent continuous sheet which is retro-reflective over its entire surface area, and which contains retro-reflecting legend areas which are normally invisible or indistinctly visible to the naked eye under diffuse light, and yet which are either more or less brightly retro-reflective than the background areas without seriously interfering with the transparency of the structure. Under daylight conditions the sheet appears either to be free of a legend or to have only a legend too faint to obscure the visual information on the opposite of the sheet, i.e., if the sheet is affixed over a photograph, the photograph remains visible to the observer, and with presently preferred constructions, one hardly notices the presence of the sheet or the legend. Yet, when viewed under retro-reflected light, even though the entire structure is retro-reflective and the photograph is thereby obscured, the legend is made quite visible because of a difference in retro-reflective efficiency between the legend (or image) areas and the background areas of the sheet material.

When measuring retro-reflective efficiency of the preferred constructions using a photometer, the legend in one typical example had a relative photometer reading (hereinafter referred to as "PV") of 20, the background areas a PV of 10 and a flat surface coated with ordinary white paint a PV of 0.1. In making such measurements, the photometer used was a Model 20, obtained from the Photovolt Corporation, New York. The photometer was located close to the beam of incident light, the divergence angle between the light source and the photometer being one-third of a degree. The reflection intensities were measured at a 5° angle of incidence (between the light source and a line perpendicular the plane of the reflective surface).

Of course, the ability of the individual's eye to differentiate retro-reflective efficiency is somewhat subjective, and will also depend on such factors as the relative size or area of the legend compared to the background and the sharpness or definition of the legend. In general, a legend having a PV of 5 is somewhat difficult to discern on a background of 6, as is a legend of PV 15 on a background of PV 18; but a legend PV 5 on a PV 14 background, or a legend PV 10 on a background PV 20 is normally very easy to observe under retro-reflective viewing conditions. While it is not practical to place a specific numerical limitation on the required relative efficiency because of the possible variations in size, shape and definition of the image areas etc., from the foregoing it is obvious that it is preferred to have either the legend or the background at least 20% brighter, and preferably 30 percent brighter or more efficient as a retro-reflector, than the background or legend respectively.

A more sophisticated determination of the photometric parameters involved in practicing preferred forms of the present invention will now be discussed.

In order that the retro-reflective sheeting does not seriously obscure the graphic intelligence or other details of the substrate to which it is applied when the composite is viewed under ordinary conditions —i.e., diffusely reflected light, the retro-reflective sheeting (particularly in the major portion —e.g. background) should have, under the measurement conditions hereinafter noted, a diffuse reflectance "D," of less than 20 percent, and preferably less than 10 percent. Moreover, the diffuse transmittance "T" of the film should be greater than 60 percent, and preferably greater than 80 percent. In any event, diffuse reflectance D should be small enough to avoid obscuring the dark areas of the substrate (such as a photograph) and diffuse transmittance T should be large enough to preserve the lighter colored substrate areas.

To measure for D and T, a sample of the retro-reflecting film may be applied to a portion of a standard paint Hiding Power Chart Form 3 (obtainable from Morest Company, New York, N.Y.). The diffuse reflectance values of the white and black areas of this chart are 75 percent or more, and 5 percent or less, respectively, and any chart meeting such requirements as set forth in ASTM Hiding Power tests D 1738–60T from part 21 of the ASTM Standard Manual on paint may be used. A photometer which illuminates the desired portion of the chart with white light at 45° incidence and measures the light reflected in a direction perpendicular to the surface with a color corrected photocell is used, e.g. a Welch Dansichron Photometer Model 451–5 with Reflection Unit (Catalog No. 3832A).

The diffuse reflectance value D and diffuse transmittance value T are then calculated as follows:

$$D = M_1M_4 - M_2M_3/M_1 - M_2 - M_1M_2(M_3M_4) \quad (1)$$

$$T = [(1 - DM_1)/M_1 (M_3 - R)]$$

where:
$M_1$ = the diffuse reflectance of the white portion of the chart
$M_2$ = the diffuse reflectance of the black portion of the chart
$M_3$ = the diffuse reflectance of the white portion when overlaid by the identification film
$M_4$ = the diffuse reflectance of the black portion when overlaid by the identification film In order that the presence of the legend in the sheet material is not readily detectable when viewed by diffusely reflected light, generally the more reflective portion of the sheet should be less than 20 percent and preferably less than 10 percent or even 5 percent more reflective than the less reflective portions when measured as will now be described.

This diffuse reflectance contrast is preferably measured by applying a sample to the black portion of the above mentioned hiding power chart and illuminating the legend and background areas with white light at an angle of incidence of 45°, and measuring the diffusely reflected light in a direction perpendicular to the surface of the sample. In order to obtain measurements of very small legend areas, a projector capable of producing white light is positioned at a distance of about 75 cm. from the surface (a Schoolmaster 500 Model 49 projector). The luminance readings are made with a color corrected, high resolution, telephotometer (a Gamma Scientific Co. Model 2000 telephotometer). The telephotometer objective lens is placed about 65 cm. from the sample and a 6 minute angular aperture is used in the image plane making possible resolution of areas having 1 mm. diameters.

As noted above, it is preferable that the more retro-reflective portion of the film be at least 20 percent brigher, and preferably at least 30 percent brigher retro-reflectively than the less reflective portion. To determine the retro-reflective contrast, the sample is applied to the black portion of the hiding power chart and the above-mentioned high resolution photometer is positioned with its objective 65 cm. from, and perpendicular to, the plane of the sample. A beam splitter is mounted in front of the photometer with its surface intersecting the optical axis between the photometer and the sample at about a 45° angle. A microscope illuminator is then positioned to the side of the optical axis, so that light therefrom strikes the beam splitter at the point where it intersects the optical axis and in a direction perpendicular to the optical axis so that a portion of the light rays striking the beam splitter are directed to the sample, retro-reflected substantially along the optical axis, with the portion passing through the beam splitter striking the photometer objective. The illuminator may be an American Optical Company microscope illuminator with a GE 1493 lamp, the illuminator having a a 1 cm. diameter aperture in front of its condensing lens, and its distance to the side of the optical axis being such that the optical distance from the sample to the illuminator condensing lens is also 65 cm. The photometer objective lens is restricted by a 6 mm. diameter aperture. The arrangement is adjusted so that the rays of light reaching the photometer objective lens are those which make an angle of 0° ± 0.5° with the illuminating beam as the rays are reflected by the sample.

In order to effectively obscure the underlying substrate when viewed with retro-reflected light, even in a well-lighted room, it is preferred that the retro-reflectance of the major area of the film (the legend in some instances, the background in others) have an absolute retro-reflective intensity of at least 8 Reflective Intensity units when measured at 0.5° divergence and 5° incidence.

To determine the retro-reflective intensity of the major portion of the sheet material, the same apparatus and arrangement as just described in measuring the retro-reflective contrast is used, except that the source and objective apertures are both reduced to 0.25° diameter (2.8 mm. for a sample distance of 65 cm.), the photometer objective is readjusted so that the viewing direction is 0.5° divergent from the illuminating direction (5.6 mm. objective displacement for a 65 cm. sample distance), the sample is tilted so that the perpendicular to its surface makes an angle of 5° to the illuminating direction, and the observed relative luminance value of the major portion of the film is converted to an absolute reflective intensity value by comparison to a known reflective intensity standard. A standard is obtained by measuring commercially available uniformly retro-reflective material (for example, 3270 "SCOTCHLITE" Brand Reflective Sheeting from the 3M Company) according to Federal Specification L-S–300A, Par. 4·4·7 *Reflective Intensity for Reflective Sheeting and Tape*, published Jan. 7, 1970.

The sheet materials of this invention are particularly useful when applied to documents, identification cards, passports, driver's licenses, credit cards, stock certificates, and the like to serve as an identification or validation medium, and as a means for making it difficult to produce a counterfeit of a valid document, license, etc.

Other advantages of the preferred sheet materials of this invention include the difficulty or removing the legend portion without destroying the structural integrity of the sheet, and the difficulty of duplicating or reproducing the legend without relatively sophisticated and expensive equipment and/or know how.

Principles and features of the invention are illustrated in the accompanying drawing, in which the numbers refer to like parts, and in which.

Figure 5:
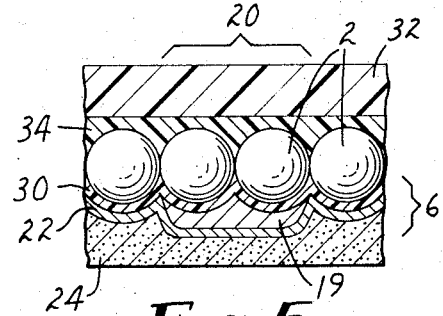
FIG. 5 is a partially schematic section through a fragment of another embodiment of the sheet material of the invention in which the outer surface of the beads are covered with a permanent transparent layer of low refractive index and the legend and background reflectors on the back side of the high refractive index beads are in the form of thin layers which form transparent mirrors.
Figure 6:
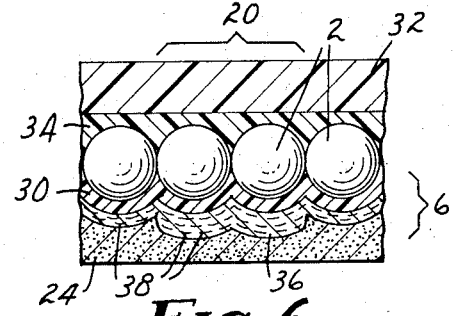
Figure 7:
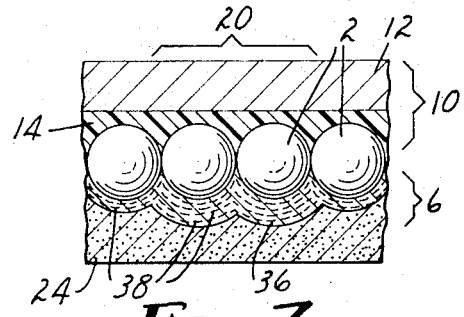

FIG. 6 is an embodiment similar to that of FIG. 5 except that the transparent legend and background reflectors are made up of layers containing pearlescent pigment rather than being in the form of layers forming a transparent mirror, and FIG. 7 is a still further embodiment of the invention in schematic section in which the outer surface of the beads are temporarily embedded in a removable carrier web and the transparent legend and background reflectors are formed from different thicknesses of layers of pearlescent or nacreous pigment arranged in close proximity and cup-like fashion about the rear surface of the beads.

The schematic drawings of FIGS. 1–7 are not literal section views, e.g. since each circle represents a full circumference as though the spheres were of uniform diameters and arranged in rows, and the reflective layer or layers are approximately hemispherically surrounding the rear surfaces of the transparent beads rather than being in a plane at the bottom (rear) surface of the beads, as diagrammatically illustrated. Furthermore, the legend normally will be much wider than the two-bead diameter width (e.g. 90 microns) as schematically illustrated.

Referring to FIGS. 1–4, the glass beads 2, having a refractive index of at least about 1.8 are approximately hemispherically embedded in one side of a removable carrier 10 which is formed of a paper web 12 having a polyethylene coating 14 thereon. On the other side of the beads there has been provided a semi-transparent dielectric mirror 6, which reflects a portion of, and transmits another portion of, light passing through the outer face of the glass beads. In its simplest form (and assuming the presence of the requirements hereinafter specified) a retro-reflective dielectric mirror may be formed as hereinafter discussed with the sequential arrangement shown in connection with either of the two outside beads of FIG. 3, viz.: a glass bead, a transparent layer or spacer coat adjacent to the bead and a further transparent layer next to the spacer coat. In the present invention, a layer is provided at the rear of the bead which is transmissive of the major portion of light rays striking its surface under conditions of diffuse illumination, but which, because of its thickness and disparate refractive index relative to the refractive index and thickness of the materials on either side of it, reflects a minor but substantial portion of the light rays striking it.

The use of dielectric mirrors as specular reflectors in retro-reflective constructions has recently been disclosed in a copending application, now U.S. Pat. No. 3,700,305. Such constructions contain glass beads or microsphere lens elements of 10 to 200 or more microns diameter (perferably 25 to 75 microns) and adjacent specularly reflecting material by using as the specularly reflecting material a dielectric mirror comprising a transparent layer of refractive index $n_1$, the faces of which are in contact with materials of refractive indices $n_2$ and $n_3$, both $n_2$ and $n_3$ being at least 0.1 (preferably at least 0.3) either higher or lower than $n_1$, and the transparent layer having an optical thickness corresponding to odd numbered multiples (i.e., 1,3,5,7 . . . ) of about one-fourth wavelength of light in the wavelength range of about 3,800 to about 10,000 Angstroms. Thus, either $n_2 > n_1 < n_3$ or $n_2 < n_1 > n_3$, and the materials on either side of the transparent layer may be either both higher or both lower in refractive index than $n_1$. When $n_1$ is higher than $n_2$ and $n_3$, $n_1$ is preferably in the 1.7 to 4.9 range, and $n_2$ and $n_3$ are preferably in the 1.2 to 1.7 range. When $n_1$ is lower than $n_2$ and $n_3$, $n_1$ is preferably in the 1.2 to 1.7 range, and $n_2$ and $n_3$ are preferably in the 1.7 to 4.9 range. The resulting specular reflector thus comprises an array of materials, at least one being in layer form, having an alternating sequence of refractive indices. In a preferred embodiment of the co-pending application, the array has from 2 to 7 layers, preferably 3 to 5 layers, adjacent to the glass microsphere. The various layers are conveniently formed on the glass microspheres after the microspheres have been temporarily substantially hemispherically embedded into a heated plastic coated web, by a vapor deposition in one or more steps to provide the desired number of layers in an alternating sequence of refractive index.

Figure 3:
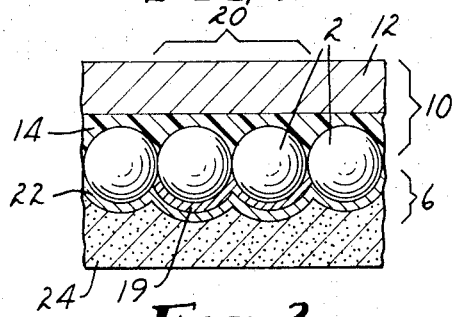

In this form of the present invention, in order to maintain the desired degree of transparency, from one up to perhaps 3 contiguous dielectric layers are provided behind the glass beads. The legend delineating material preferably is introduced into the sheeting during the manufacturing process as a separate noncoextensive layer in the layer array forming the dielectric mirror in optical connection with the spherical beads. The legend can be simply a spacer coat or layer formed between the spherical lenses and the layers of laternating refractive index thereon, or it can be placed between the various layers of alternating refractive index. The legend may be formed by having at least one more, or one less, dielectric layer behind the "legend" beads, as compared to the number of layers behind the background beads. The mirror may be colored or colorless, but must be at least partially light transmissive so that it does not substantially interfere with viewing of the underlying substrate or exceed the desired degree of visual contrast with the background areas. In preferred form, the lgend is of a thickness and refractive index, and is so positioned so that it becomes a functional part of the dielectric mirror. Thus, as illustrated in FIG. 3, the beads 2 may have a diameter of about 0.05 mm, and a refractive index of about 1.9, the discontinuous varnish layer 19 delineating the legend 20 having a thickness under about 0.002 mm and a refractive index of about 1.5 and entering into formation of the legend area 20. The continuous layer 22 is of an optical thickness equal to one-fourth wavelength of visible light, and if of, e.g. zinc sulfide has a refractive index of approximately 2.4. The adhesive layer 24 has a refractive index of about 1.5. Accordingly, a retro-reflective sheet with a transparent mirror 6 (specifically a dielectric mirror) in optical connection with the beads has been formed in the background areas of the structure, and an even more efficient retro-reflective portion with a dielectric mirror behind the beads has been formed in the sheet in the legend or image areas 20.

Figure 4:
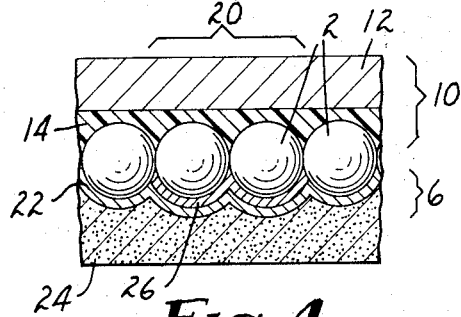

The construction of FIG. 4 differs from FIG. 3 in that the legend area 20 of FIG. 4 has been formed by applying, instead of the varnish 19, a dielectric coating 26 with an optical thickness of approximately one-fourth wavelength of visible light and using e.g. cryolite to provide a refractive index of 1.38 between the glass beads in the legend area and the continuous layer 22 formed of e.g. zinc sulfide with refractive index of about 2.37. Over the layer 22 is coated a thermoplastic adhesive of about 1.5 index. Because of the better control on the thickness of the legend and the lower refractive index thereof, an even brighter legend on a bright background would appear under retro-reflective viewing than that obtained with the structure of FIG. 3 if both were formed using the materials as just described.

Figure 1:
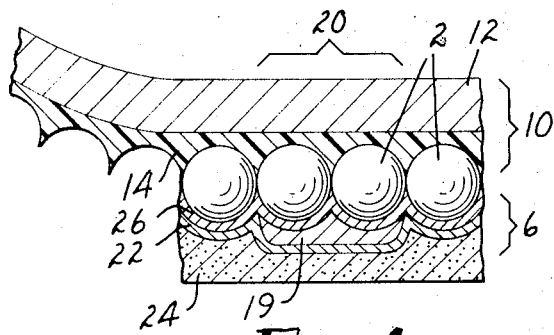
FIGS. 1–4 are partially schematic sections through a fragment of sheet material according to the invention in which the monolayer of beads on the outer surface of the transparent retro-reflective sheet are held in a temporary removable carrier and the legend and background reflectors behind the beads are in the form of dielectric mirrors.
Figure 2:
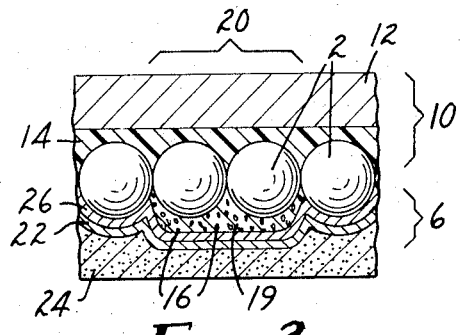

In FIGS. 1, 2 and 5 the dielectric mirror 6 comprises the adhesive layer 24 of transparent material having an index of approximately 1.5, and at least one continuous dielectric layer 22 or 26 having an optical thickness of one-fourth wavelength of visible light, the layer 22 for example having an index of 2.37 and the layer 26 an index of 1.38. The legend area 20 is delineated by interposing between the beads 2 and at least one of the continuous layers 22 or 26, a non-coextensive layer 19 which may be of such thickness or material that it interferes with the efficiency of the optical mirror in conjunction with the microsphere lenses directly in front of it, as compared to its efficiency in conjunction with the microspheres in the background areas where the legend is not present; or it may be of a material, as in FIG. 3, which makes it a part of the array of layers in the mirror, and thus enhance the reflective efficiency thereof. In FIG. 2 the legend delineating layer of varnish 19 also includes particles 16 of crushed glass which tend to scatter incoming light. Thus, under retro-reflective viewing conditions the legend would appear as a darker area against a brighter background.

FIGS. 5 and 6 also illustrate a further variation of the invention. These structures incorporate certain of the teachings of Palmquist et al., U.S. Pat. No. 2,407,680. More specifically, as opposed to "exposed lens" systems which result when the carrier 10 is removed from the structures of FIGS. 1–4 and 7, in the structures of FIGS. 5 and 6 the outer or topmost layer 32 is a permanent transparent covering having a flat front surface, which is of a lower refractive index (e.g. 1.5) than the glass beads (e.g. beads of 2.6 index) which are held in a transparent bead-binder layer 34. In these structures, the transparent reflective mirror may be spaced from the glass beads in accordance with the teachings of U.S. Pat. No. 2,407,680, for example by the use of a transparent spacer layer 30 as shown in FIGS. 5 and 6. Other variations of the invention disclosed in the Palmquist et al patent are also useful in practicing the present invention, some of which are described hereinafter in connection with Examples 5 and 6.

Nacreous or pearlescent pigments are available in naturally-occurring or synthetic flake form and can be used as a "semi-transparent mirror" within the scope of the invention. As disclosed in a co-pending application, if nacreous pigment having maximum diameters in the range of about 8 to 30 microns, and thicknesses in the range of about 25 to 200 millimicrons are coated in a liquid binder about the exposed portions of hemispherically embedded beads, the pigments will form in cup-like contiguous fashion about the surface of the beads to provide a very efficient retro-reflective lend-reflective mirror system. Less efficient but useful structures for the purpose of the present invention may be made employing nacreous pigment with average particle sizes outside the just-mentioned range and in situations where they are not in such close cup-like fashion around the rear surfaces of the beads.

In FIGS. 6 and 7 the semi-transparent mirror 6 comprises the reflective coating of layer 36 containing nacreous or pearlescent pigment platelets 38, the amount of pigment applied being controlled so that it is insufficient to opacify the sheet and obscure any substrate to which it is applied in either the legend or background areas. The thickness of the coating 36 in the legend delineating area 20 differs sufficiently from its thickness in the background area so that the thicker of the two areas is visually discernable as a brighter reflector when the sheet is observed under retro-reflective viewing conditions.

Similarly, it is known to form semi-transparent mirrors, e.g. by vapor deposition of very thin coatings of certain materials, e.g. metals such as aluminum, and while use of this type of material is generally less preferred, its use in accordance with teachings hereof is likewise considered to be within the general scope of the invention.

The invention will now be more particularly described in the following examples which serve to specifically illustrate formation of the retro-reflective sheeting schematically shown in several of the figures of the drawings.

EXAMPLE 1

A polyethylene coated paper sheet having embedded in the polyethylene coating a monolayer of clear glass beads of a refractive index of about 1.93 ($n_D$) and diameters of about 50 microns (which are embedded in the polyethylene coat to about 40 percent of their diameters), was coated in a vacuum chamber with a layer of cryolite ($Na_3AlF_6$), having a refractive index of about 1.37 to a thickness of approximately one-fourth of the wavelength of ordinary white light. A complete description of how this glass bead coated sheet starting material can be produced is described in U.S. Pat. No. 3,190,178, col. 8, lines 3–22.

The sheet was next printed on the beaded side with a transparent colorless lithographic alkyd varnish of about 1.5 refractive index (obtained from Lawter Chem. Co. under the designation 1711 Lithographic Varnish), using a lithographic offset press to "print" a plaid "watermark"-like design or legend over some of the cryolite coated beads. After the varnish had air dried overnight the carrier web was coated in the vacuum chamber with a quarter wavelength thickness of zinc sulfide of about 2.37 refractive index. This provided a transparent mirror coating consisting of the quarter wavelength cryolite followed by the quarter wavelength zinc sulfide in the unprinted areas, and a less efficient transparent mirror coating consisting of quarter wavelength cryolite, a thicker coat of transparent varnish and a quarter wavelength coating of zinc sulfide in the printed legend areas.

The sheeting was next coated with a hydrosol type of aqueous dispersion of methyl methacrylate, ethyl acrylate co-polymer (Du Pont's "Elvacite" Acrylic Hydrosol 9012) containing 6 percent butyl cellosolve as a thickener. The spreader bar on the coating machine was set at a height of approximately 0.2 mm.

After allowing the coated sheet to dry overnight, this sheeting was placed face down against the face of a colored Kodacolor positive photographic print and heated in a platen press at a pressure of about 2 kgs/sq.cm. at 121° C. for 1 minute, then about 3.8 kg/sq.cm. at 115° C. for one minute. Upon cooling, the polyethylene-treated paper carrier could be easily removed by peeling it away from the color picture leaving on the surface of the color print a transparent monolayer of exposed lens beads. When the photograph was examined under ordinary daylight one could readily see the details of the picture in full color with only a slight haziness caused by the transparent sheeting. When the photograph was examined in a special retro-reflective viewing box (or examined with a flashlight held close to and between the observer's eyes and aimed at the photograph) the entire background of the photo reflected a brilliant white color with the printed image of the plaid design visible as a dark gray color on the white background. In this particular instance an automobile driver's license with the bearer's color photograph on the face of the license was used to demonstrate a typical useful document to which the identification sheeting of this example could be attached.

Evaluation of the retro-reflective sheeting according to this Example showed that it had a diffuse reflectance value D of 5.9 percent and a diffuse transmittance value T of 79 percent. The diffuse reflective contrast however was 2 percent. The retro-reflective contrast was 43 percent and the absolute retro-reflective intensity was 47. The sheeting was suitable for practice of the invention, although less preferred than the material of, e.g. Example 3 hereinafter described.

The just-described reflectorized drivers license was subjected to various treatments in an attempt to remove the sheet material in such a way that the retro-reflective coating could be transferred to another photograph in an attempt to produce a "counterfeit" of the original. For example, the license was flexed under various temperatures and humidity conditions, it was soaked in water (with and without detergents) under various conditions and also subjected to careful attempts at skiving with cutting blades. In each of these attempts it was found impossible to remove the retro-reflective sheeting in such a way that it would be suitable for attachment to and reuse on a counterfeited or altered picture or license.

EXAMPLE 2

The bead-coated polyethylene sheet starting material of Example 1 was provided with a transparent design legend by silk screening the legend on the beaded surface using an air drying soya bean alkyd solution containing 50 percent solvent and 30 parts by weight of crushed ordinary borosilicate glass. The crushed glass particles were of a size range in which 90 percent would pass through a screen with 44 micron openings but would be retained by a screen with 37 micron openings. After drying, the transparent legend had a rough surfaced appearance, similar to that of flat (nonglossy) wall paints. The beaded side of the sheet was then vapor coated with a quarter wavelength layer of cryolite followed by a quarter wavelength layer of zinc sulfide to form a semi-transparent mirror in optical connection with the glass microspheres.

The beaded surface of the sheet was then attached to a 0.127 mm. thick thermoplastic film consisting of 90 parts by weight of an ethylene vinyl alcohol copolymer (Du Pont's Elvon 30E) and 10 parts by weight of an epichlorohydrin homopolymer (B. F. Goodrich's Hydrin 100). The film had been produced by heat fusing the ingredients together and calendering the mixture into a 0.127 mm. self-supporting film. The film was heat calendered to the bead coated sheeting by using a silicone release coated paper in contact with the thermoplastic film with the calender roll temperatures set at about 150° C.

A 5 cm. square piece of the just described laminated sheet was adhered to a paper document by using an ordinary hand iron against the polyethylene treated paper with the iron temperature ser on the "wool" setting. Upon cooling the polyethylene paper was easily peeled away leaving a retro-reflective transparent coating on the document through which the printing on the document could be read. When examined with a flashlight as described in Example 1, the silk screened legend appeared as a dark image on a bright white reflecting background. When measured as above described, the retro-reflective contrast was 58 percent and the absolute retro-reflective intensity was 49.

EXAMPLE 3

The beaded polyethylene coated sheet starting material of Example 1 was printed with a legend on the exposed bead surface with an offset flexographic printing unit using the same alkyd lithographic varnish as in Example 1 but with the addition of 1.1 percent cobalt napthenate as a drier. After drying, the printed bead surface was then vapor coated with a one-fourth wavelength thickness of zinc sulfide, i.e., a coating thickness of approximately 600 Angstroms. An adhesive was applied over the vapor coat using the same acrylic hydrosol as in Example 1, except that the hydrosol had been thickened by the addition of about 9 percent by weight of the mono-butyl ether of ethylene glycol (butyl Cellosolve) to a coating viscosity within the range of 600–800 cps and diluted to a solids content of 27.3 percent. The wet coating thickness was about 0.013 cm. The adhesive was then dried to a tack-free state by heating for about 7-½ minutes at temperatures within the range of 76° to 125° C.

The sheet material was then adhered to a substrate by heating the interface momentarily between hot lamination rolls to a temperature of about 120° to 132° C. After cooling the laminate to room temperature the polyethylene coated carrier was stripped away.

In Examples 1 and 2 there appeared, under retro-reflective viewing conditions, a relatively dark legend on a brighter background while the instant Example provided a bright legend on a less bright background. Since it is easier to destroy retro-reflection, for example by printing a transparent legend of proper refractive index over the lenticular (exposed) bead surface of a retro-reflective sheet, the bright background, brighter legend of the instant example is a presently preferred construction. In possible explanation of the results observed in the present example, it would appear that the additional reflectance in the image area results from the provision of an extra reflecting surface and the increase in the refractive index difference at the interface with the zinc sulfide in the legend area.

When applied to the hiding power chart and measured as above described, the sheet material has a diffuse reflectance "D" of 6.4 percent, a diffuse transmittance "T" of 88.5 percent, a diffuse contrast of 2 percent and a retro-reflective contrast of 32 percent. The absolute retro-reflective intensity was 20.4.

EXAMPLE 4

A transparent 0.025 mm. thick film of biaxially oriented polyethylene terephthalate polymer (Du Pont's "Mylar") was coated with a 0.1 mm. spreader bar setting with a very low refractive index transparent bead bond material, 90 parts by weight of a 33 percent solution of polyvinylidene fluoride copolymerized with hexafluoropropylene (Du Pont's "Viton") in methyl isobutyl ketone and 10 parts by weight of a 33 percent solution of polyethyl methacrylate in xylol into which was dropped a monolayer of 50 micron diameter glass beads having a refractive index of approximately 2.6. These beads can be produced by the method as described in U.S. Pat. No. 3,149,016. After drying the beaded sheet was vacuum coated with a quarter wavelength thickness coating of cryolite. A legend was then silk screen printed onto the beaded surface using a clear air drying alkyd screen process paste and allowed to dry, after which a quarter wavelength thickness coating of zinc sulfide was applied in the vacuum coater.

A transparent pressure sensitive adhesive was next applied to the beaded side of the sheet by coating an adhesive solution onto a silicone paper release liner at a 0.20 mm. wet spreader bar setting on the coating machine and after drying laminating under pressure to the beaded sheet. The pressure sensitive adhesive consisted of a 22 percent solids solution of a copolymer of 90 percent isooctyl acrylate and 10 percent acrylic acid. Upon application to a paper document after removal of the silicone release liner, it was found that the adhesion was sufficiently great that the paper fibers in the document would be pulled loose when attempting to remove the optical sheeting. On observation with a flashlight as described in Example 1 the legend could be seen as a dark pattern in a white reflecting background.

EXAMPLE 5

The sheet material of this example illustrates another non-exposed bead surface type of transparent retro-reflective sheeting in accordance with the invention. It is similar in part to Example 3 of Palmquist et al. U.S. Pat. No. 2,407,680.

Specifically, a low adhesion carrier web is roll coated with N-butyl-methacrylate polymer resin dissolved in xylol 45 percent resin solids) to provide a coating weight between 5.4 to 6.3 mg. of resin solids per sq. cm. The coating is dried for 20–30 minutes at 60° C. followed by additional drying for 30–40 minutes at 80° to 90° C. Its refractive index is approximately 1.48.

Next, the integral transparent binder coating for the beads is formed by knife or roll coating the transparent covering surface with 2.5 to 3.8 mg. per sq.cm. of the following resin solution:

| | Parts by weight |
|---|---|
| N-butyl-methacrylate resin | 45 |
| Methylacrylate-isobutylacrylate solution polymer | 33 |
| Xylol | 55 |

Transparent glass beads of about 2.1 refractive index are applied over the bead binder coating and allowed to sink therein. Solvent from the bead binder coating is removed by a drying period of 20–25 minutes at 60° C. and 30–40 minutes at 80° to 90° C. Beads of approximately 90 to 105 microns diameter are used.

The transparent spacing film is next, formed by knife or roll coating the beaded surface with the same resin solution as the transparent binder coating for beads. A solution coating weight of 6.3 to 7.5 mg/sq.cm. is used, followed by a drying period of 20–30 minutes at 60° C. and 60–90 minutes at 90° to 105° C.

Next, the legend markings were printed using a rubber plate print method. The ink used was as follows:

| | Parts by weight |
|---|---|
| Polyvinylbutyral | 20 |
| Cellosolve | 40 |
| N-butanol | 40 |
| Pearlescent pigment | 6 |

The print is reverse printed and dried for a period of 5–10 minutes at 65° C. followed by a drying period of 15–20 minutes at 93° C.

Following the print, another layer of pearlescent coating is printed, knife or roll coated to the entire surface. The solution formula is as follows:

| | Parts by Weight |
|---|---|
| Polyvinylbutyral | 10 |
| Cellosolve | 45 |
| N-butanol | 45 |
| Pearlescent Pigment | 3 |

This coating was dried in the same way as the first pigment coating. The pearlescent pigment used was Nacromer ZSPB 9542.

Next, a coating of a transparent pressure-sensitive acrylate copolymer adhesive was coated over the surface of the reflector layer.

When applied over a printed page, the print was legible under ordinary lighting, but when viewed under retro-reflective viewing conditions, the print was obscured by the overlying sheet, the legend appearing brighter compared to the background.

When applied to the hiding power chart and tested as above described, the sheet material of this Example was found to have a diffuse reflectance "D" of about 13 percent, a diffuse transmittance "T" of about 73 percent, the diffuse contrast was 23 percent and the retro-reflective contrast was 33 percent. The absolute retro-reflectance value was 4.9.

EXAMPLE 6

Another non-exposed bead surface transparent retro-reflective sheet according to the invention was prepared as in Example 5 except that in place of the pearlescent pigment containing reflector coatings there is first applied a legend marking by means of the application of a printed image using the transparent binding coating of Example 5. After drying a quarter wavelength thickness vapor deposited layer of zinc sulfide was applied over the "printed" spacing film. Next a thin layer of transparent acrylate-acrylic acid copolymeric pressure-sensitive adhesive was coated over the zinc sulfide layer.

When applied to the hiding power chart and measured as above described, the sheet material of this example was found to have a diffuse reflectance "D" of about 10 percent, a diffuse transmittance "T" of about 81 percent, the diffuse contrast was 9 percent and the retroreflective contrast was 94 percent. The absolute retro-reflectance value 8.6.

EXAMPLE 7

A continuous partially light-transmissive mirror was formed over the rear surface of a monolayer of glass microspheres by coating at a wet coating thickness of 0.005 cm. a dilute dispersion containing pearlescent pigment over the exposed portion of the beaded polyethylene-coated sheet starting material of Example 1.

The dispersion had the following formulation in parts by weight:

| | Parts by Weight |
|---|---|
| 2-butanone | 59.8 |
| Dimethyl formamide | 20.1 |
| Highly crystalline polyurethane resin (Estane 5740 – x 130 from B. F. Goodrich Co.) | 5.9 |
| 86:13 by weight copolymer of vinyl chloridevinyl acetate resin with 1% interpolymerized maleic acid ("VMCH" resin from Union Carbide Co.) | 4.5 |
| Nacreous pigment paste (VCG Pearl pigment from Koppers Co.) | 9.7 |

The nacreous pigment paste contains lead carbonate platelets having average maximum dimensions of about 22 microns and average thicknesses of about 55 millimicrons. There is 60 percent by weight of the pigment in a paste of polyvinyl chloride resin dissolved in methyl isobutyl ketone.

The coated sheet was allowed to dry for 20 minutes at room temperature followed by 15 minutes drying in an oven at 65° C.

This dry sheet was placed, pigment layer side up, under a legend-bearing stencil. The dried pigmented layer was sprayed with another portion of the above pigment formulation which was first diluted to a solvent content of 88.3 percent with 2-butanone. This left a second non-coextensive application of pearlescent pigment on the bead sheet in the form of a legend corresponding to the stencil openings. After drying, the sheet was then coated with the acrylic hydrosol dispersion, and dried as described in Example 1.

After heat-laminating a portion of this sheet material to the hiding power chart and measuring as above described, the sheet was found to have a diffuse reflectance "D" of 8.8 percent, a diffuse transmittance "T" of 88 percent, the diffuse contrast was about 8 percent and the retro-reflective contrast was 20 percent. The absolute retro-reflective intensity was 11.4.

What is claimed is:

1. A legend-containing, substantially transparent sheet which is retro-reflective over its entire surface area, said sheeting having retro-reflective legend areas and retro-reflective background areas, which areas are substantially indistinguishable under ordinary diffuse light viewing conditions, but one of said areas having a greater retro-reflective efficiency than the other whereby said legend areas are readily visually discernible from said background areas under retro-reflective viewing conditions, said sheet containing a monolayer of glass microspheres of at least 1.8 refractive index and having diameters averaging in the 10 to 300 micron range, all of said microspheres having a partially light-transmissive mirror at the rear surfaces thereof, the microspheres and associated mirrors in the legend area having a different retro-reflective efficiency than the microspheres and associated mirrors in the background areas.

2. A sheet material according to claim 1 in which the microspheres and associated mirrors in the legend areas have a retro-reflective efficiency which is at least 20 percent different than the retro-reflective efficiency of the microspheres and associated mirrors in the non-legend areas.

3. A sheet material according to claim 2 in which said partially light-transmissive associated mirror comprises at least one continuous layer containing pearlescent pigment.

4. A sheet material according to claim 2 in which said partially light-transmissive associated mirror comprises at least one continuous layer of a thin coating of a metallic material.

5. A sheet material according to claim 2 in which said partially light-transmissive associated mirror is a dielectric mirror comprising at least one continuous later of a dielectric material having an optical thickness corresponding to an odd numbered multiple of about one-fourth wavelength of light within the range of 3,800 to 10,000 Angstroms.

6. A sheet material according to claim 2 in which the retro-reflecting element of the sheet material comprises a mono-layer of glass microspheres having on one side thereof a light transmissive dielectric mirror comprising at least one layer of a transparent material having an optical thickness corresponding to odd numbered multiples of about one-fourth wavelength of light in the wavelength range of about 3,800 to 10,000 Angstroms, there further being present, on the same side of the beads as said one layer, a substantially transparent legend comprising at least one non-coextensive layer between said microspheres and the furthermost layer of said dielectric motor, the said noncoextensive layer being positioned to alter the optical efficiency of said dielectric mirror whereby upon application of the sheeting to a substrate and observation thereof under retro-reflecting viewing conditions there exists a readily visually discernible difference in the retro-reflecting efficiency between the legend areas and the background areas of said sheeting.

7. A retro-reflective sheeting according to claim 1 in which the diffuse reflectance of said sheeting when measured as herein described is less than 20 percent and the diffuse transmittance is greater than 60 percent.

8. An article bearing graphic intelligence having attached to at least a portion of one intelligence-bearing surface thereof a substantially transparent covering, said covering being sufficiently transparent so that said graphic intelligence is legible therethrough and being retro-reflective over its entire surface area and having retro-reflective legend areas and retro-reflective background areas, which areas are substantially indistinguishable under ordinary diffuse-lighting viewing conditions, but one of said areas having a greater retro-reflective efficiency than the other whereby said legend areas are readily visually discernible under retro-reflective viewing conditions, said covering containing a monolayer of glass microspheres of at least 1.8 refractive index, all of said microspheres having a partially light-transmissive mirror positioned between said microspheres and said surface, the microspheres and associated mirrors in the legend areas having a different retro-reflective efficiency than the microspheres and associated mirrors in the background areas.

9. An article according to claim 8 in which said partially light-transmissive mirror comprises at least one layer of a material having an optical thickness corresponding to odd-numbered multiples of about one-fourth wavelength of light in the range of about 3,800 to 10,000 Angstroms, there further being present between said microspheres in said legend area and the outermost layer of said dielectric mirror a substantially transparent legend layer which alters the retro-reflective efficiency of said legend area microspheres and associated mirror whereby there exists a readily visually discernible difference in the retro-reflective efficiency between the legend areas and the background areas of said covering.

10. An article according to claim 8 in which said covering, when measured as herein described, has a diffuse reflectance of less than 20 percent and a diffuse transmittance of at least 60 percent.

11. An article according to claim 9 in which said covering, when measured as herein described, has a diffuse reflectance of less than 20 percent and a diffuse transmittance of at least 60 percent.

* * * * *